United States Patent [19]

Richmond et al.

[11] 4,139,406

[45] Feb. 13, 1979

[54] METHOD OF MAKING BANDED BELTS

[75] Inventors: Kenneth D. Richmond, Nixa; Jerry W. Hill, Springfield; Joseph P. Regan, Springfield; Walter E. Huber, Springfield, all of Mo.

[73] Assignee: Dayco Corporation, Dayton, Ohio

[21] Appl. No.: 831,567

[22] Filed: Sep. 8, 1977

[51] Int. Cl.² .......................... B29D 29/02; B29H 7/22
[52] U.S. Cl. ........................................ 156/140; 74/233; 156/141; 264/280; 264/284
[58] Field of Search ............... 156/138, 139, 140, 141, 156/142; 264/280, 284, 293, 347; 425/363, 369, 370, 373, 28 B, 28 D, 29, 30, 34 B, 35, 38, 40, 43; 74/23 CB, 233, 234

[56] References Cited

U.S. PATENT DOCUMENTS

| 2,039,271 | 4/1936 | Bierer | 156/322 |
| 2,142,971 | 1/1939 | Bierer | 425/373 |
| 2,142,972 | 1/1939 | Bierer | 425/373 |
| 2,958,096 | 11/1960 | Hunt et al. | 264/284 |
| 3,477,895 | 11/1969 | Sauer | 156/250 |
| 3,565,984 | 2/1971 | Sauer | 264/280 |
| 3,891,364 | 6/1975 | Muller | 425/373 |

*Primary Examiner*—Caleb Weston
*Attorney, Agent, or Firm*—Reuben Wolk

[57] ABSTRACT

A method of producing endless power transmission belts having a plurality of longitudinal ribs by the steps of forming an annular belt sleeve, positioning the sleeve on a continuous curing apparatus, forming longitudinal ribs in the compression section, and curing the formed belt. An additional step of stabilizing the cured belt is provided when the belt has a load-carrying cord of polyester.

13 Claims, 5 Drawing Figures

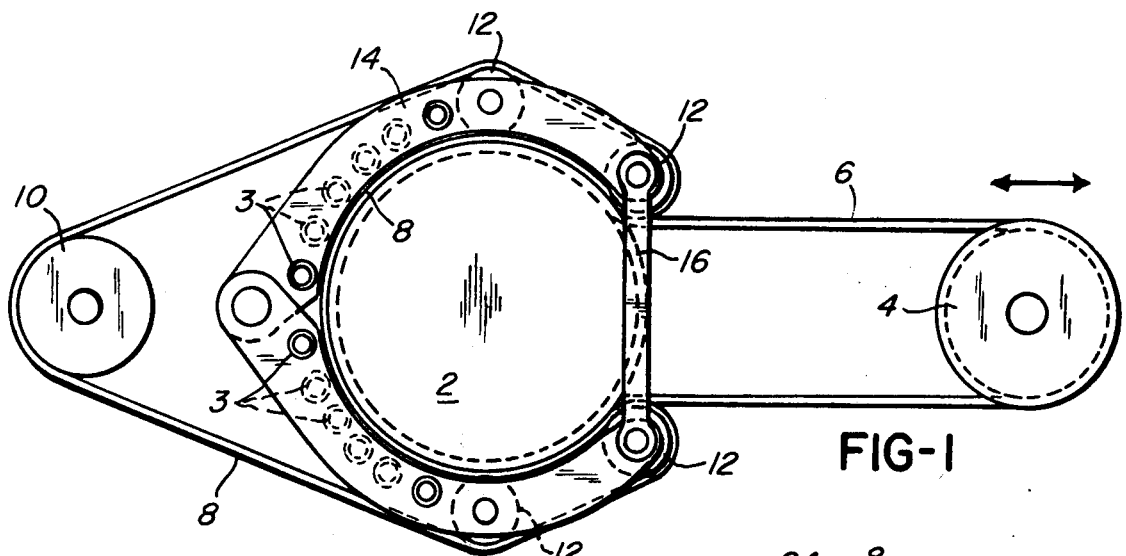
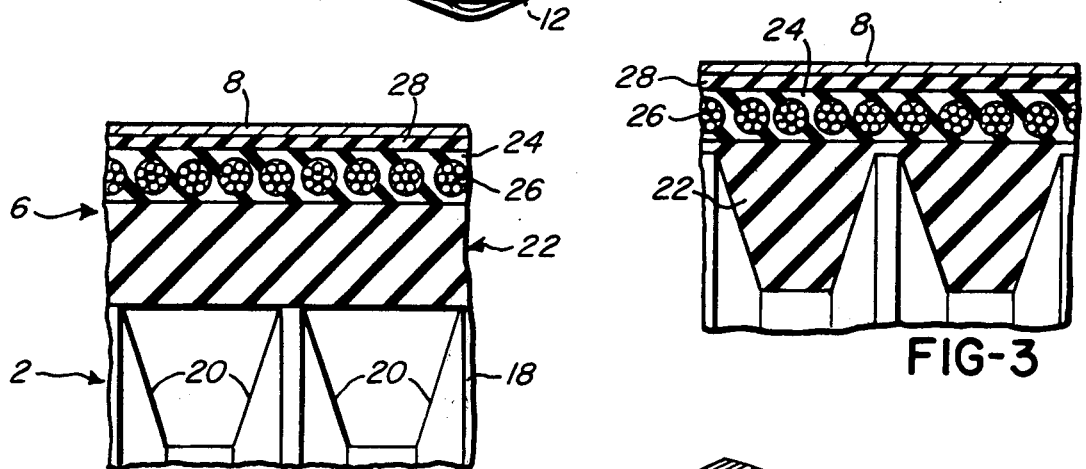
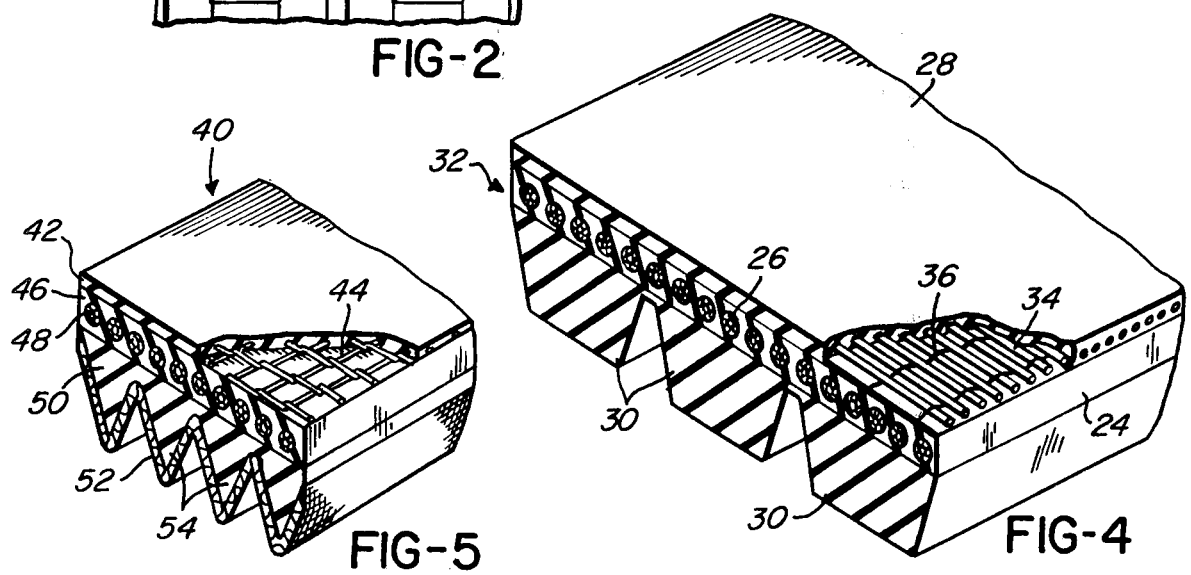

METHOD OF MAKING BANDED BELTS

BACKGROUND OF THE INVENTION

There are numerous types of endless power transmission belts in present use which are made primarily of elastomeric materials, known as V-ribbed belts. These belts have longitudinal ribs in the compression section as an integral part of the belt, and the ribs may be V-shaped or in the form of truncated Vees. The fabrication of such belts is usually complex and expensive, and there is a constant effort to find new ways of manufacturing which are simpler and less costly.

Some of the most recent methods of making belts of this type are disclosed in U.S. Pat. Nos. 3,822,516; 3,839,116; 3,891,405; and 3,981,206. The use of such belts is illustrated by U.S. Pat. Nos. 3,951,006; 4,028,995; and 4,031,761.

The present invention is an improvement over the prior art, particularly with respect to the number of fabricating steps necessary to produce a V-ribbed belt. According to the present invention, a belt sleeve is fabricated by assembling the various components in a conventional manner on a drum. However, instead of using curing devices such as shown in U.S. Pat. Nos. 3,839,116 and 3,981,206, the curing is accomplished on a curing mechanism known as "Rotocure", which comprises a heated cylinder and an endless band passing around the cylinder. Such a mechanism is shown, for example, in U.S. Pat. No. 2,039,271.

While it is known to treat a complete sleeve of material in order to form it into individual belts, for example as outlined in U.S. Pat. Nos. 3,477,895 and 3,565,984, the present invention is an improvement over the teaching of these patents, in that sufficient rubber is employed in fabricating the belt sleeve to completely fill the grooved roller during the forming process so that the load-carrying cord is continuous across the sleeve. The load-carrying cord, according to the present invention, is not cut into individual belt widths and is not compressed into the body of the belt, which would result in distortion.

A further feature of the method of this invention is that belts having polyester load-carrying cord are formed completely on the vulcanizing apparatus and do not require subsequent stabilization on a separate apparatus as is disclosed in U.S. Pat. No. 3,761,558.

It is therefore an object of the present invention to provide an improved process for producing a V-ribbed belt.

Other objects, aspects and several advantages of the present invention will be apparent to those skilled in the art from a reading of the following detailed description, as well as the appended claims.

SUMMARY OF THE INVENTION

In accordance with the present invention, there is provided a process for producing a V-ribbed belt comprising a compression section, a load-carrying section and a tension section, which belt has a plurality of longitudinal ribs, either V-shaped or of truncated V-shape, in the compression section. The process of the present invention comprises the steps of:

a. Fabricating a belt sleeve comprising an inner compression layer of moldable uncured rubber, a load-carrying layer of helically-wound cord, and an outer tension layer;

b. Positioning the belt sleeve over a rotatably mounted vulcanizing cylinder having a plurality of axially spaced circumferential mold ribs forming belt element grooves therebetween, and in contact with the ribs;

c. Tensioning the belt sleeve;

d. Applying pressure to the tension section of the belt sleeve while rotating the vulcanizing cylinder to thereby force the compression layer into the grooves, forming the belt elements; and e. Curing the rubber while in the grooves.

BRIEF DESCRIPTION OF THE DRAWINGS

In the drawings:

FIG. 1 shows part of the vulcanizing unit in equipment for employing the process of the present invention;

FIG. 2 is a fragmentary sectional view showing the initial belt forming operation;

FIG. 3 is a fragmentary sectional view showing the belt completely formed prior to and during the curing operations;

FIG. 4 is a fragmentary perspective view of one exemplary embodiment of a truncated V-ribbed belt produced in accordance with the invention; and FIG. 5 is a fragmentary perspective view of another exemplary embodiment of a V-ribbed belt produced in accordance with the invention.

DESCRIPTION OF THE PREFERRED EMBODIMENT

The initial operations involved in the forming of the belt sleeve according to the present invention are substantially identical to those used in the prior art. The belt sections are built up in a sleeve form onto a mandrel, either a fixed or an expansion mandrel, which is well known in the V-belt manufacturing art. Generally, the elements of the sleeve include a layer of compression rubber, a layer of tension members which usually include a single helically wound cord, and a layer of top rubber or rubber-impregnated fabric. It is presently preferred that the sleeve also include layers of cushion stock arranged above and below the tension members. The belt sleeve, when built in this manner, is substantially identical to that of the prior art. However, in prior art methods, the sleeve is next cut into individual belt widths which are subsequently removed from the mandrel, separated and subjected to a series of manipulative steps which reduce the individual belts to the approximate contour of the mold in which the belts are to be cured.

In accordance with the present invention, the belt sleeve is removed from the mandrel and transferred directly to the forming and curing apparatus.

Referring now to the drawings, FIG. 1 shows a conventional rotary curing apparatus, of the type also described in U.S. Pat. No. 2,039,271, comprising a large vulcanizing cylinder 2, rotatable about a horizontal axis and heated internally by heating means, not shown, such as electrical resistance heaters; and externally by heating means 3, such as infrared heaters. The vulcanizing cylinder 2 cooperates with a tensioning roller 4 that can be adjusted and locked in the direction in which the belt sleeve 6 to be treated is tensioned. One or more belt sleeves 6 pass around the vulcanizing cylinder 2 and the roller 4. The vulcanizing cylinder 2 will be described in greater detail hereinafter.

Also slowly passing around the vulcanizing cylinder 2 is pressure band 8, which can be tensioned by means of an adjustable roller 10. The band 8 is also led around guide rollers 12, mounted on pivotally connected arms 14, which are held together by a pair of straps 16.

Referring now to FIG. 2, the vulcanizing cylinder 2 is provided with a plurality of axially spaced circumferential mold ribs 18 having belt element grooves 20 therebetween. Although trapezoidal shaped grooves are shown in FIG. 2, grooves which provide a "V" shape can also be provided.

The belt sleeve 6, which comprises a compression section 22, a load-carrying section 24 longitudinally reinforced with at least one layer of helically wound cord 26 and a tension section 28, is positioned over the vulcanizing cylinder 2 in contact with the ribs 18. The belt sleeve 6 is placed under tension by moving the tensioning roller 4 in a direction away from the vulcanizing cylinder 2. The tensioning roller can have a cylindrical surface, although it is presently preferred that the tensioning roller 4 be provided with mold ribs and belt element grooves corresponding in cross-section to the ribs 18 and grooves 20 in the vulcanizing cylinder 2.

The belt 8 is then tensioned by means of adjustable roller 10 while rotating vulcanizing cylinder 2, thereby applying pressure to the outer tension section 28 of the belt sleeve 6. This pressure forces the compression section 22 into the grooves 20 of the vulcanizing cylinder 2, forming the belt elements, as shown in FIG. 3.

During the forming step, the vulcanizing cylinder 2 is rotated at a rate of one revolution for every 15 to 30 minutes. The temperature of the vulcanizing cylinder 2 is elevated above ambient temperature during the forming step, and is sufficient to render the rubber of the compression section 22 moldable, but less than the temperature required to effect vulcanization of the sleeve 6.

After the belt sleeve 6 has passed completely around the vulcanizing cylinder one time, the temperature of cylinder 2 is increased to vulcanizing temperature, and the sleeve 6, now having formed belt elements corresponding to the cross-section of the grooves 20, as shown in FIG. 3, is passed around the vulcanizing cylinder 2 a second time to effect vulcanization. This forms the completed V-ribbed belt. Upon completion of the vulcanization operation, the pressure band 8 is removed from the vulcanization cylinder 2. If desired, the completed belt can be removed from cylinder 2 by releasing tensioning roller 4. Alternatively, the completed belt can be cooled while mounted on the vulcanizing apparatus prior to removal therefrom.

The term rubber, as used herein and in the claims, is intended to include any vulcanizable elastomeric material, natural or synthetic, normally used in building power transmission belt structures.

The load-carrying cord 26 can be any suitable material known in the art, such as cotton, rayon, nylon, fiberglass, aramid, or the like, including blends and mixtures thereof. The load-carrying cord 26 can also be a polyester cord, in which case additional processing steps are required and which form a part of the present invention.

In the case of a belt sleeve 6 having a polyester load-carrying cord 26, the desired belt element cross-section is formed, as described previously. At the end of the first cycle, i.e., the forming cycle, the sleeve is tensioned by means of tensioning roller 4 to a predetermined belt length and the vulcanizing cylinder 2 is heated to the desired vulcanizing temperature. The thus-formed belt is vulcanized, as previously described. Following the second cycle, i.e., the vulcanizing cycle, the vulcanized belt is subjected at least one additional cycle, preferably two additional cycles, at vulcanization temperature to stabilize the polyester cord. The pressure band 8 is then removed, tension is released and the completed belt is removed from the apparatus.

The completed truncated V-ribbed belt made according to the above process is illustrated in FIG. 4, and is designated by reference number 32. The belt has at least 2 and preferably not greater than 5, trapezoidal shaped belt elements 30, also called truncated V-ribs. The belt 32 comprises load-carrying section 24 reinforced with cord 26, and tension section 28. In the embodimdent shown, the tension section includes a layer of elastomeric material in which are embedded laterally extending cords 34 in spaced substantially parallel relation along the endless path of the belt, with each of the cords 34 extending across the entire transverse dimension of the band 32. The cords 34 are of the type often referred to in the art as "tire cord". Such tire cord has relatively weak tie strands 36 holding the strength cords 34, substantially parallel. However, the tension section may incorporate bias laid woven fabric, "stress-relieved" fabric in which the warp and weft threads are at an angle of 95° to 155° with each other; knitted fabric; or other fabrics employed as tension fabrics. In addition, other belt constructions may be utilized, such as placing a layer of fabric inwardly of the compression section 22, so that the fabric covers the rib portions or trapezoidal elements 30.

FIG. 5 illustrates a further form of the invention in which the completed belt 40 has V-shaped ribs 54 instead of the truncated-V or trapezoidal shape of belt 32. The manufacturing process for this belt is the same as described above, except that the mold grooves are altered to achieve the V-shaped ribs. Belt 40 includes an outer tension section 42, which consists of an elastomer in which is embedded a fabric layer 44, illustrated as being a knit fabric. However, this fabric may be of the "tire cord" type shown in belt 32, bias woven, stress-relieved, or other known types. The belt 40 also comprises a strength section 46 having a longitudinally extending strength cord 48; a compression section 50 in the shape of V-ribs; and a cover fabric 52 which may be woven, knitted, or formed of special types of compounds. The fabric 52 may be omitted, as shown in FIG. 4.

As indicated above, the completed belt sleeve 6 may be formed to provide a finished belt 32 or a belt 40, each having any desired number of ribs, but preferably between 2 and 5. However, such a sleeve may have more ribs than desired in a finished belt; for example, 10, 12 16, or more. In such a case, the completed sleeve may be cut into individual belts, such as 32 or 40, having the number of ribs required. Thus, each sleeve provides a plurality of belts.

Other forms of the invention are also contemplated as being within the scope of the inventive concept.

We claim:

1. A process for making a belt comprising a compression section, a load-carrying section and a tension section, said compression section having a plurality of laterally spaced longitudinally extending ribs, which comprises the steps of:
   a. Fabricating a belt sleeve of an inner compression layer of uncured rubber, an intermediate load-carrying layer including a continuous helically-wound cord, and an outer tension layer;

b. Positioning said belt sleeve over a rotatably mounted vulcanizing cylinder having a plurality of axially spaced circumferential mold grooves, with said compression layer in contact with said cylinder;

c. Tensioning said belt sleeve;

d. Applying inward pressure to said tension layer while rotating said vulcanizing cylinder to thereby force said compression layer into said mold grooves, to form said ribs, sufficient rubber being present in said compression layer to fill said mold grooves; and e. Curing said sleeve.

2. The process of claim 1 wherein said mold grooves have a generally trapezoidal cross-section.

3. The process of claim 1 wherein said mold grooves have a generally V-shaped cross-section.

4. The process of claim 1 additionally comprising the step of cutting individual belts, each having at least two ribs, from the resulting cured belt sleeve.

5. The process of claim 1 including the step of incorporating into said tension layer a plurality of tensile members arranged in spaced substantially parallel relation along the endless path of said belt, each of said tensile members extending across the entire transverse dimension of said sleeve.

6. The process of claim 1 including the step of incorporating a knitted fabric into said tension layer.

7. The process of claim 1 including the step of incorporating a bias woven fabric into said tension layer.

8. The process of claim 1 including the step of applying a layer of fabric inwardly of said inner compression layer in contact with said mold grooves.

9. The process of claim 1 including the step of releasing said tensioning of said belt sleeve after said curing step, and subsequently removing said sleeve from said cylinder.

10. The process of claim 9 including the step of cooling said cured belt sleeve to ambient temperature prior to releasing said tensioning.

11. The process of claim 1 including the steps of heating said sleeve to a first predetermined temperature during said rib forming step, said first temperature being sufficient to render said compression layer moldable but insufficient to cure said rubber; and thereafter curing said sleeve at a second predetermined temperature.

12. The process of claim 11 wherein said helically-wound cord is a polyester cord and further comprising increasing the tension on the belt sleeve following said rib forming step, including the further step of maintaining the resulting increased tension throughout said curing step.

13. The process of claim 12 comprising the step of continuing to rotate said cylinder at said second predetermined temperature following said curing step until all portions of the resulting cured belt have passed in contact with said cylinder at least one further time.

* * * * *